US010998177B2

(12) United States Patent
Takahashi et al.

(10) Patent No.: US 10,998,177 B2
(45) Date of Patent: May 4, 2021

(54) ION ANALYZER

(71) Applicants: SHIMADZU CORPORATION, Kyoto (JP); THE DOSHISHA, Kyoto (JP)

(72) Inventors: Hidenori Takahashi, Kyoto (JP); Motoi Wada, Kyotanabe (JP)

(73) Assignees: SHIMADZU CORPORATION, Kyoto (JP); THE DOSHISHA, Kyoto (JP)

( * ) Notice: Subject to any disclaimer, the term of this patent is extended or adjusted under 35 U.S.C. 154(b) by 43 days.

(21) Appl. No.: 16/500,124

(22) PCT Filed: Mar. 29, 2018

(86) PCT No.: PCT/JP2018/013441
§ 371 (c)(1),
(2) Date: Oct. 2, 2019

(87) PCT Pub. No.: WO2018/186286
PCT Pub. Date: Oct. 11, 2018

(65) Prior Publication Data
US 2020/0111654 A1    Apr. 9, 2020

(30) Foreign Application Priority Data

Apr. 4, 2017 (JP) .............................. JP2017-074183

(51) Int. Cl.
*H01J 49/00* (2006.01)
*H01J 49/04* (2006.01)
*G01N 27/622* (2021.01)

(52) U.S. Cl.
CPC ........ *H01J 49/0422* (2013.01); *G01N 27/622* (2013.01); *H01J 49/0495* (2013.01)

(58) Field of Classification Search
CPC ........ H01J 49/00; H01J 49/02; H01J 49/0422; H01J 49/26; H01J 49/005; H01J 49/0045
(Continued)

(56) References Cited

U.S. PATENT DOCUMENTS 7,723,676 B2     5/2010  Vilkov et al.
2010/0140466 A1*  6/2010  Hartmer .............. H01J 49/0072
                                                        250/282

(Continued)

OTHER PUBLICATIONS

McLuckey, Scott A., "Principles of collisional activation in analytical mass spectrometry", Journal of the American Society for Mass Spectrometry, 1992, pp. 599-614, vol. 3.
(Continued)

*Primary Examiner* — Jason L McCormack
(74) *Attorney, Agent, or Firm* — Sughrue Mion, PLLC

(57) ABSTRACT

An ion analyzer that generates product ions from precursor ions derived from a sample component and analyzes the product ions includes a reaction chamber (2) into which the precursor ion is introduced, a radical generation chamber (51), a material gas supply source (52) configured to introduce material gas into the radical generation chamber (51), a vacuum evacuator (57) configured to evacuate the radical generation chamber (51), a vacuum discharge unit (53) configured to generate a vacuum discharge in the radical generation chamber (51), a radical irradiation unit (54) configured to irradiate an inside of the reaction chamber (2) with radicals generated from the material gas in the radical generation chamber (51), and a separation and detection (3) configured to separate and detect product ions generated from the precursor ion by reaction with the radicals according to at least one of a mass-to-charge ratio and ion mobility.

9 Claims, 5 Drawing Sheets

(58) Field of Classification Search
USPC .................................. 250/281, 282, 288
See application file for complete search history.

(56) References Cited

U.S. PATENT DOCUMENTS

| | | | |
|---|---|---|---|
| 2011/0315869 A1* | 12/2011 | Ishiguro | H01J 49/0013 250/282 |
| 2012/0175515 A1* | 7/2012 | Hori | G01N 27/622 250/282 |
| 2016/0372311 A1* | 12/2016 | Takahashi | H01J 49/06 |

OTHER PUBLICATIONS

Syka, John E.P., et al., "Peptide and protein sequence analysis by electron transfer dissociation mass spectrometry", Proceedings of the National Academy of Sciences of the United States of America, Jun. 29, 2004, pp. 9528-9533, vol. 101, No. 26.

Takahashi, Hidenori, et al., "Hydrogen Attachment/Abstraction Dissociation (HAD) of Gas-Phase Peptide Ions for Tandem Mass Spectrometry", Analytical chemistry, 2016, pp. 3810-3816, vol. 88.

Sablier, M. et al., "Fragmentations induced by ion-atom reactions", Journal of the American Society Mass Spectrometry, 1997, pp. 587-593, vol. 8, No. 6.

Andrey N. Vilkov et al., "Peptide Fragmentation Induced by Radicals at Atmospheric Pressure", Journal of Mass Spectrometry, Apr. 2009, pp. 477-484, vol. 44, No. 4.

Doshisha Univ. et al., "Development of a Compact Atom Beam Source by Capacitively Coupled Plasma at 2.45GHz", Proceedings of the 77th Annual Conference of the Japan Society of Applied Physics, Sep. 2016, Japan Society of Applied Physics.

Matsutani, A. et al., "Characterization of $H_2O$-inductively coupled plasma for dry etching", Journal of Physics: Conference Series, 2008, pp. 1-5, vol. 100, No. 6, p. 062022, IOP Publishing.

International Search Report of PCT/JP2018/013441 dated Jun. 19, 2018 [PCT/ISA/210].

Written Opinion of PCT/JP2018/013441 dated Jun. 19, 2018 [PCT/ISA/237].

\* cited by examiner ns are used as reactive ions for
ION ANALYZER

CROSS REFERENCE TO RELATED APPLICATIONS

This application is a National Stage of International Application No. PCT/JP2018/013441, filed Mar. 29, 2018, claiming priority to Japanese Patent Application No. 2017-074183, filed Apr. 4, 2017.

TECHNICAL FIELD

The present invention relates to an ion analyzer that produces product ions from a precursor ion derived from sample components by reactions such as dissociation, chain scission, and addition of atoms or molecules to analyze the product ions.

BACKGROUND ART

In order to identify a large molecular compound or analyze a structure of the large molecular compound, a kind of mass spectrometry is widely used in which an ion derived from a sample component is dissociated one or more times to generate fragment ions (also called product ions), and the fragment ions are separated and detected according to a mass-to-charge ratio. For example, an ion trap time-of-flight mass spectrometer is used as an apparatus for carrying out such mass spectrometry. As a method for dissociating a precursor ion having a large molecular weight captured in an ion trap in the ion trap time-of-flight mass spectrometer, collision induced dissociation (CID) is most common, which makes an excited precursor ion collide with gas of argon or the like to induce dissociation (see, for example, Non Patent Literature 1). However, the CID is an energy storage type ion dissociation method, in which energy given to a precursor ion is dispersed throughout the molecule, and hence selectivity of the position at which the precursor ion is dissociated is low. Accordingly, the ion dissociation method is not suitable when it is necessary to dissociate precursor ions at a specific site (e.g., binding position of amino acid) when, for example, a protein or a peptide is analyzed.

Electron Transfer Dissociation (ETD) is known as an ion dissociation method capable of dissociating a protein or a peptide at a specific site (see Non Patent Literature 2). In the ETD, negative molecular ions are introduced as reaction ions into an ion trap, and are caused to collide with precursor ions captured in the ion trap. At this time, an electron of a reaction ion is transferred to a protonated site of a precursor ion to generate a hydrogen radical. The hydrogen radical thus generated is bound to a precursor ion derived from a protein or a peptide, and the precursor ion is selectively dissociated at a N—Cα bond position of a peptide main chain.

Since, as described above, in the ETD, the N—Cα bond of the peptide main chain is specifically cleaved, c/z series fragment ions, which are difficult to be generated by the CID, are easily generated. In addition, since the dissociation occurs while a modification such as a sugar chain is retained as it is, identification of the modification and identification of the modification site are easy, and it is useful for analyzing post-translational modification (PTM) of proteins and peptides.

However, the ETD is a method effective only for positive ions because negative ions are used as reactive ions for ionization, and it is difficult to dissociate negative ions. Further, the valence of an ion decreases by one at each dissociation. Thus, the operation of performing dissociation several times to generate, for example, an immonium ion including a side chain of an amino acid can only be applied to positive ions with valences equal to or larger than the number of amino acid residues. Another problem is that the dissociation efficiency is low when it is used with a matrix-assisted laser desorption/ionization (MALDI) ion source, since most of ions generated by MALDI, which is most widely used for ionization of proteins and peptides, are monovalent ions.

Under these circumstances, various new dissociation methods have been attempted in recent years. One such dissociation method is hydrogen attachment and dissociation (HAD) method proposed by the present inventors (see Non Patent Literature 3). In Non Patent Literature 3, it has been proposed that hydrogen gas is introduced into a capillary heated to 2000° C. to generate hydrogen radicals (hydrogen atoms) by thermal dissociation reaction, and precursor ions are irradiated with the hydrogen radicals. Similarly to the ETD, the HAD is also a radical induced ion dissociation method in which a hydrogen radical is bound to a precursor ion, and thus the precursor ions can be dissociated at a specific site. In addition, the HAD has an advantage that it can be used regardless of a polarity or valence of the precursor ions. In addition, there have also been proposed a method of introducing hydrogen gas into a microwave discharger to generate hydrogen radicals, and irradiating precursor ions with the hydrogen radicals (hereinafter referred to as "microwave radical generation method") (see Non Patent Literature 4), and a method of generating radicals by corona discharge of water vapor and irradiating precursor ions with the radicals (hereinafter referred to as "corona discharge radical generation method") (see Non Patent Literature 5).

CITATION LIST

Patent Literature

Patent Literature 1: U.S. Pat. No. 7,723,676

Non Patent Literature

Non Patent Literature 1: McLuckey, Scott A. "Principles of collisional activation in analytical mass spectrometry." Journal of the American Society for Mass Spectrometry 3.6 (1992): 599-614.

Non Patent Literature 2: Syka, John E P, et al. "Peptide and protein sequence analysis by electron transfer dissociation mass spectrometry." Proceedings of the National Academy of Sciences of the United States of America 101.26 (2004): 9528-9533

Non Patent Literature 3: Takahashi, Hidenori, et al. "Hydrogen Attachment/Abstraction Dissociation (HAD) of Gas-Phase Peptide Ions for Tandem Mass Spectrometry." Analytical chemistry 88.7 (2016): 3810-3816.

Non Patent Literature 4: Sablier, M., Mestdagh, H., Poisson, L., Leymarie, N., & Rolando. C. (1997). Fragmentations induced by ion-atom reactions. Journal of the American Society for Mass Spectrometry, 8(6), 587-593.

Non Patent Literature 5: Vilkov (Andrey N. Vilkov) and two others, "Peptide Fragmentation Induced by Radicals at Atmospheric Pressure", Journal of Mass Spectrometry, 2009, Vol. 44, pp. 477 to 484.

Non Patent Literature 6: Shimabukuro, Kasuya., Wada, "Development of a Compact Atom Beam Source by Capacitively Coupled Plasma at 2.45 GHz", Proceedings of the 77th Annual Conference of the Japan Society of Applied Physics, September 2016, Japan Society of Applied Physics

SUMMARY OF INVENTION

Technical Problem

The method described in Non Patent Literature 3 cannot generate radicals from material gas other than hydrogen gas. Actually in Non Patent Literature 4, use of material gas other than hydrogen gas is not proposed. The hydrogen gas is difficult to handle and involves potential danger. Further, since only hydrogen radicals are generated from hydrogen gas, radical species which can be irradiated to precursor ions are limited to only the hydrogen radicals. Furthermore, for the microwave radical generation method, currently there has been only reported an example for use in dissociation of small molecular weight compounds (hydrocarbons) having a mass number of 100 or less, and it is unclear whether it is effective in dissociation of precursor ions derived from biopolymers such as proteins and peptides.

On the other hand, the material gas used in the corona discharge radical generation method proposed in Non Patent Literature 5 is water vapor, which is easy to handle and has no danger. However, since corona discharge does not occur under high vacuum, a space of atmospheric pressure (or a pressure close to atmospheric pressure) must be provided. In the mass spectrometer, a mass separator that selects precursor ions and a mass separator that mass-separates fragment ions generated by dissociation of precursor ions should be disposed in a high vacuum space. If an atmospheric pressure space is to be placed between the mass separators, a large vacuum pump must be provided before and after the space, which makes the apparatus large and expensive. Furthermore, radicals generated under atmospheric pressure collide with surrounding gas and radicals and easily disappear due to recombination or the like, and there is also a problem that the utilization efficiency of radicals is low.

Here, the case where fragment ions generated by dissociation of precursor ions are measured by the mass spectrometer is described as an example. However, when product ions in which atoms or molecules are added to precursor ions are measured, or when fragment ions and product ions are separated according to ion mobility, similar problems to the above occur. That is, there have been similar problems to the above in the ion analyzer which generates product ions from precursor ions by reaction such as dissociation or addition of atoms and molecules and analyzes the ions.

A problem to be solved by the present invention is to provide an ion analyzer capable of generating radicals from material gas that is easy to handle under high vacuum, and causing the radicals to react with precursor ions derived from a large molecular compound to generate product ions.

Solution to Problem

The present invention, which has been made to solve the above-mentioned problems, is an ion analyzer that generates product ions from a precursor ion derived from a sample component and analyzes the product ions, the ion analyzer including:

a) a reaction chamber into which the precursor ion is introduced;

b) a radical generation chamber;

c) a material gas supply source configured to introduce material gas into the radical generation chamber;

d) a vacuum evacuator configured to evacuate the radical generation chamber;

e) a vacuum discharge unit configured to generate vacuum discharge in the radical generation chamber;

f) a radical irradiation unit configured to irradiate an inside of the reaction chamber with radicals generated from the material gas in the radical generation chamber; and g) a separation and detection unit configured to separate and detect product ions generated from the precursor ion by reaction with the radicals according to at least one of a mass-to-charge ratio and ion mobility.

The product ions include not only fragment ions generated by dissociation of the precursor ion, but also ions generated by adding atoms or molecules to the precursor ion.

As the reaction chamber, for example, an ion trap that selects and captures precursor ions having a specific mass-to-charge ratio by operation of an electric field may be used. Alternatively, it is possible to use a collision cell through which precursor ions selected by the mass separator located in the previous stage pass.

For the vacuum discharge unit, for example, a radio-frequency plasma source or a hollow cathode plasma source can be used. When the radio-frequency plasma source is used, the temperature of the generated radicals is higher and the reactivity of the radicals is higher in a capacitively-coupled type than in an inductively-coupled type. Thus, it is expected to increase product ion generation efficiency when the capacitively-coupled type is used.

In the ion analyzer according to the present invention, precursor ions derived from a sample component are introduced into the reaction chamber, and the precursor ions in the reaction chamber are irradiated with radicals generated from the material gas by vacuum discharge in the radical generation chamber evacuated to a predetermined degree of vacuum using the vacuum evacuator. Thus, the precursor ions react with the radicals to generate product ions. The generated product ions are separated and detected in the separation and detection unit according to at least one of a mass-to-charge ratio and ion mobility.

In the ion analyzer according to the present invention, since a vacuum discharge unit such as a radio-frequency plasma source or a hollow cathode plasma source is used, it is not necessary to provide an atmospheric pressure space in the ion analyzer. Further, since radicals are generated using plasma generated by vacuum discharge, radicals can be generated from various types of material gases such as water vapor and air that are easy to handle.

When the inventors conducted experiments, which will be detailed later, in which precursor ions derived from peptides captured in the ion trap are irradiated with radicals and product ions generated are mass-separated and detected, fragment ions specifically dissociated at an amino acid binding site in a peptide were detected when irradiation with hydroxyl radicals, oxygen radicals, nitrogen radicals, and hydrogen radicals is performed. In particular, in an experiment of irradiation with hydroxyl radicals and oxygen radicals, fragment ions specifically dissociated at an amino acid binding site in a peptide were detected at high intensity.

Therefore, in the ion analyzer according to the present invention, the radicals preferably include at least one of hydroxyl radical, oxygen radical, nitrogen radical, and hydrogen radical, and more preferably include, in particular, at least one of hydroxyl radical and oxygen radical. Examples of raw materials which can generate such radicals include water (water vapor), hydrogen peroxide, and air. Water and air are preferred as material gas also from the point that they are safe to handle. However, usable material gas and radical species are not limited to these examples. For example, it is also possible to generate radicals from chlorides, sulfur compounds, fluorides, hydroxides, oxides, and carbides represented by hydrochloric acid, sodium chloride, sulfuric acid, sodium sulfide, hydrofluoric acid, sodium fluoride, sodium hydrogen carbonate, sodium hydroxide, hydrogen peroxide, carbon dioxide, carbohydrates, and hydrocarbons, respectively for use in dissociation reaction.

Preferably, the ion analyzer according to the present invention further includes h) a heat application unit configured to apply heat to the precursor ions introduced into the reaction chamber. By applying heat to the precursor ions, their internal energy is increased and thus the reactivity with radicals is increased. This causes product ions generated with high efficiency.

Furthermore, the heat application unit preferably includes a heating unit that heats the reaction chamber. By the heat application unit including the heating unit configured to heat the reaction chamber, the reactive gas can be removed from the reaction chamber to prevent contamination of the inside of the ion trap. This is particularly effective when the material gas is reactive gas.

Advantageous Effects of Invention

By using the ion analyzer according to the present invention, it is possible to generate radicals from material gas, which is easy to handle under high vacuum, and causing the radicals to react with precursor ions derived from a large molecular compound to generate product ions.

DESCRIPTION OF EMBODIMENTS

An embodiment of an ion analyzer according to the present invention will be described below with reference to the drawings. The ion analyzer of the present embodiment is an ion trap-time-of-flight (IT-TOF) mass spectrometer.

Figure 1:
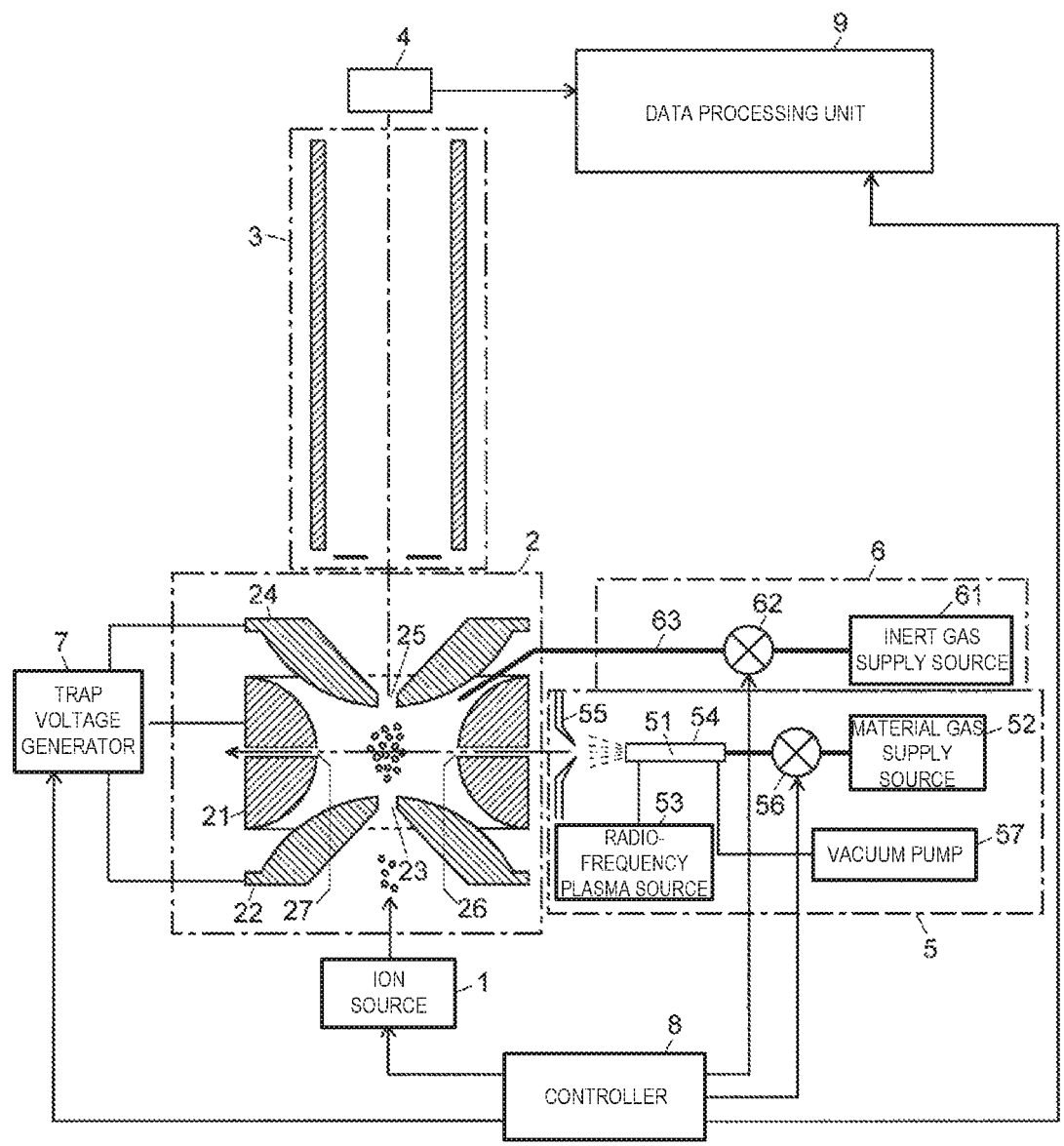
FIG. 1 is a schematic configuration diagram of an ion trap time-of-flight mass spectrometer that is an embodiment of an ion analyzer according to the present invention.

FIG. 1 illustrates a schematic configuration of the ion trap-time-of-flight mass spectrometer (hereinafter, also simply referred to as "mass spectrometer") of the present embodiment. The mass spectrometer of the present embodiment includes, inside a vacuum chamber (not illustrated) maintained in a vacuum atmosphere, an ion source 1 that ionizes components in a sample, an ion trap 2 that captures ions generated by the ion source 1 by operation of a radio-frequency electric field, a time-of-flight mass separator 3 that separates ions ejected from the ion trap 2 according to a mass-to-charge ratio, and an ion detector 4 that detects separated ions. The ion trap mass spectrometer of the present embodiment further includes a radical irradiation unit 5 for irradiating precursor ions captured in the ion trap 2 with radicals in order to dissociate the ions captured in the ion trap 2, an inert gas supplier 6 that supplies a predetermined inert gas into the ion trap 2, a trap voltage generator 7, a controller 8, and a data processing unit 9.

The ion source 1 of the mass spectrometer of the present embodiment is a MALDI ion source. In the MALDI ion source, a substance that easily absorbs laser light and is easy to ionize (matrix substance) is applied to a surface of a sample to microcrystallize the matrix substance incorporating sample molecules, and the sample is irradiated with a laser light, so as to ionize the sample molecules. The ion trap 2 is a three-dimensional ion trap including an annular ring electrode 21 and a pair of endcap electrodes (an inlet-side endcap electrode 22 and an outlet-side endcap electrode 24) disposed to oppose each other with the ring electrode 21 interposed therebetween. A radical introduction port 26 and a radical releasing port 27 are formed in the ring electrode 21, an ion introduction hole 23 is formed in the inlet-side endcap electrode 22, and an ion ejection hole 25 is formed in the outlet-side endcap electrode 24. The trap voltage generator 7 applies one of a high-frequency voltage and a DC voltage or a combined voltage thereof to each of the electrodes 21, 22, 24 at a predetermined timing upon instruction from the controller 8.

The radical irradiation unit 5 includes a nozzle 54 having a radical generation chamber 51 formed inside, a material gas supplier (material gas supply source) 52 that introduces material gas into the radical generation chamber 51, a vacuum pump (vacuum evacuator) 57 that evacuates the radical generation chamber 51, an inductively coupled radio-frequency plasma source 53 that supplies microwaves for generating vacuum discharge in the radical generation chamber 51, a skimmer 55 that has an opening on a central axis of jet flow from the nozzle 54 and separates diffusing material gas molecules and the like to take out a radical stream with a small diameter, and a valve 56 provided in a flow path from the material gas supply source 52 to the radical generation chamber 51. As the material gas, for example, water vapor (water), air, or the like can be used. When water vapor is used as the material gas, hydroxyl radicals, oxygen radicals, and hydrogen radicals are generated, and when air is used, mainly oxygen radicals and nitrogen radicals are generated.

Figure 2:
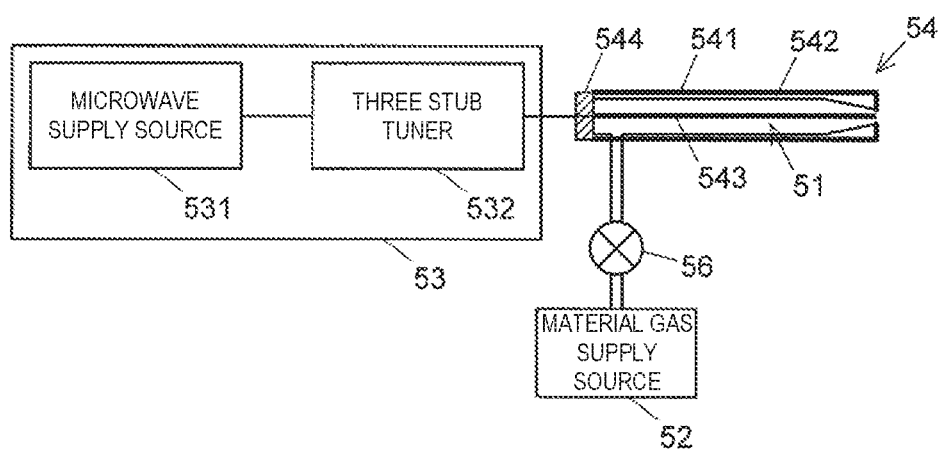
FIG. 2 is a schematic configuration diagram of a radical irradiation unit used in the ion trap time-of-flight mass spectrometer of the present embodiment.

For the radical irradiation unit 5, for example, one described in Non Patent Literature 6 can be used. A schematic configuration of the radical irradiation unit 5 is illustrated in FIG. 2. This radical irradiation unit 5 is mainly constituted of the material gas supply source 52, the radio-frequency plasma source 53, and the nozzle 54. The radio-frequency plasma source 53 includes a microwave supply source 531 and a three stub tuner 532. The nozzle 54 is provided with a grounding electrode 541 forming an outer peripheral portion, and a torch 542 made of Pyrex (registered trademark) glass located inside the grounding electrode 541, and an inside of the torch 542 is the radical generation chamber 51. Inside the radical generation chamber 51, a needle electrode 543 connected to the radio-frequency plasma source 53 with a connector 544 interposed therebetween penetrates in a longitudinal direction of the radical generation chamber 51. Further, a flow path for supplying the material gas from the material gas supply source 52 to the radical generation chamber 51 is provided, and a valve 56 for adjusting the flow rate of the material gas is provided on the flow path.

The inert gas supplier 6 includes a gas supply source 61 storing helium, argon or the like used as buffer gas or cooling gas, a valve 62 capable of adjusting a flow rate, and a gas introduction tube 63.

Next, an analysis operation in the mass spectrometer of the present embodiment will be described. Before start of analysis, each of the insides of the vacuum chamber and the radical generation chamber 51 is evacuated to a predetermined degree of vacuum by the vacuum pump. Subsequently, the material gas is supplied from the material gas supply source 52 to the radical generation chamber 51 of the radical irradiation unit 5, and microwaves are supplied from the radio-frequency plasma source 53 to generate radicals inside the radical generation chamber 51.

Various ions (mainly monovalent ions) generated from a sample such as a peptide mixture in the ion source 1 are ejected from the ion source 1 in a packet form, pass through the ion introduction hole 23 formed in the inlet-side endcap electrode 22, and introduced into the ion trap 2. Peptide-derived ions introduced into the ion trap 2 are captured by a radio-frequency electric field formed in the ion trap 2 by a voltage applied from the trap voltage generator 7 to the ring electrode 21. Thereafter, a predetermined voltage is applied from the trap voltage generator 7 to the ring electrode 21 and so on, and thereby ions included in a mass-to-charge ratio range other than target ions having a specific mass-to-charge ratio are excited and removed from the ion trap 2. Thus, precursor ions having a specific mass-to-charge ratio are selectively captured in the ion trap 2.

Subsequently, the valve 62 of the inert gas supplier 6 is opened, and an inert gas such as helium gas is introduced into the ion trap 2 to cool the precursor ions. Thus, the precursor ions are converged near a center of the ion trap 2. Thereafter, the valve 56 of the radical irradiation unit 5 is opened, and a gas containing radicals generated in the radical generation chamber 51 is ejected from the nozzle 54. Gas molecules are removed by the skimmer 55 located in front of the jet flow of the nozzle, and radicals having passed through the opening of the skimmer 55 form a beam having a small diameter, and pass through the radical introduction port 26 bored in the ring electrode 21. Then, the radicals are introduced into the ion trap 2 and irradiated to the precursor ions captured in the ion trap 2.

At this time, the opening degree or the like of the valve 56 is adjusted so that a flow rate of the radicals irradiated to the ions becomes equal to or more than a predetermined flow rate. Further, an irradiation time of the radicals to the precursor ions is also set appropriately. The opening degree of the valve 56 and the irradiation time of the radicals can be determined in advance based on a result of a preliminary experiment or the like. When the radicals are irradiated, dissociation induced by unpaired electrons occurs in the precursor ions to generate product ions derived from a peptide. Various product ions generated are captured in the ion trap 2 and cooled by helium gas or the like from the inert gas supplier 6. Thereafter, a high DC voltage is applied from the trap voltage generator 7 to the inlet-side endcap electrode 22 and the outlet-side endcap electrode 24 at a predetermined timing, by which the ions captured in the ion trap 2 receive accelerated energy and are simultaneously ejected through the ion ejection hole 25. As mentioned above, the product ions produced here may include both fragment ions and adduct ions.

Thus, ions having constant acceleration energy are introduced into a flight space of the time-of-flight mass separator 3 and are separated according to the mass-to-charge ratio while flying through the flight space. The ion detector 4 sequentially detects separated ions, and the data processing unit 9 having received a detection signal of the ion detector 4 creates a time-of-flight spectrum in Which a time point of ejection of the ions from the ion trap 2 is a time zero, for example. Then, a product ion spectrum is created by converting the flight time into a mass-to-charge ratio using mass calibration information obtained in advance. The data processing unit 9 identifies a component (peptide) in the sample by performing predetermined data processing based on information (mass information) obtained from this mass spectrum, and the like. Among product ions, a partial structure of the peptide can be recognized from the mass-to-charge ratio of fragment ions. Further, from specificity of additional substance of adduct ions, the presence of a site having a certain property, or the like contained in the peptide is recognized. For example, it is known that oxygen is easily attached to methionine and aromatic amino acids, and information such as the numbers of methionine and aromatic amino acids contained in the peptide can be obtained from the adduct ions to which oxygen is added.

As described above, in the mass spectrometer of the present embodiment, precursor ions derived from sample components are introduced into the ion trap 2, radicals are generated from the material gas by radio-frequency discharge in the radical generation chamber 51 evacuated to a predetermined degree of vacuum by the vacuum pump 57, and the precursor ions in the ion trap 2 are irradiated with the radicals. Thus, the precursor ions react with the radicals to generate product ions. The generated product ions are separated and detected in the time-of-flight mass separator 3 according to the mass-to-charge ratio.

In the mass spectrometer of the present embodiment, since the radical irradiation unit 5 including the radio-frequency plasma source 53 is used, it is not necessary to provide an atmospheric pressure space inside the mass spectrometer as in the conventional configuration in which radicals are generated using corona discharge. In addition, since radicals are generated using plasma generated using the radio-frequency plasma source 53, radicals can be generated from various types of material gases such as water vapor and air that are easy to handle. Therefore, it is not necessary to use hydrogen gas which is difficult to handle as in the conventional HAD, and radicals of various atomic species can be used.

Next, results of an experiment conducted by the present inventors will be described, in which precursor ions derived from a peptide captured in the ion trap 2 are irradiated with radicals, and generated product ions are mass-separated and detected.

Figure 3:
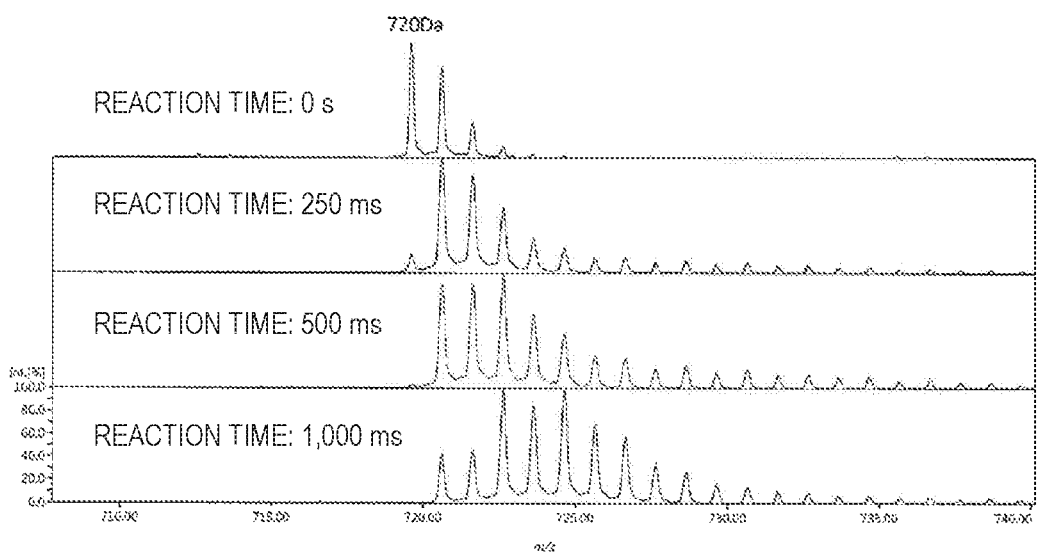
FIG. 3 is mass spectra obtained by irradiating fullerene ions with radicals generated from water vapor by radio-frequency discharge under vacuum and measuring ions in the mass spectrometer of the present embodiment.

FIG. 3 is experimental results confirming that hydrogen radicals are generated from water vapor in the mass spectrometer of the present embodiment. The results in this experiment are mass spectra obtained by capturing fullerene ($C_{60}$) ions in the ion trap 2, irradiating the fullerene ions with radicals generated from water vapor, and measuring reacted ions. In the mass spectra obtained by changing the reaction time (radical irradiation time) to 0 s, 250 ms, 500 ms, and 1,000 ms, the mass-to-charge ratio of fullerene ions shifts by a mass of hydrogen radical (1 Da) as the reaction time increases, From these results, it can be seen that hydrogen radicals are generated by discharge of water vapor and added to the fullerene ions.

Figure 4:
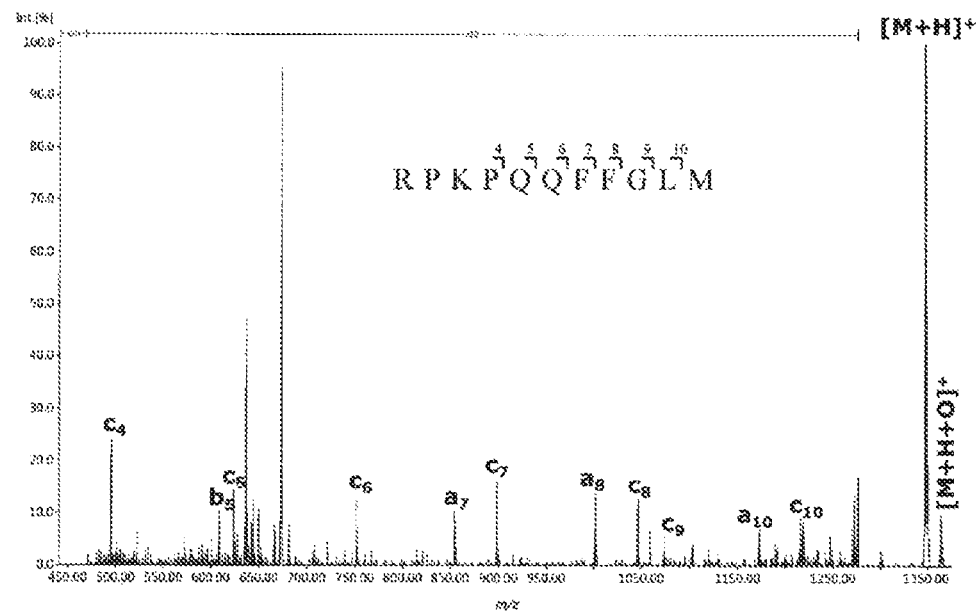
FIG. 4 is a mass spectrum brained by irradiating peptide ions with radicals generated from water vapor by radio-frequency discharge under vacuum and measuring ions in the mass spectrometer of the present embodiment.

FIG. 4 is a product ion spectrum obtained by capturing peptide ions (arrangement: RPKPQQFFGLM) in the ion trap 2 and irradiating the peptide ions with radicals generated by radio-frequency discharge of water vapor under vacuum (frequency 2.5 GHz, applied power 50 W) for 500 ms. The degree of vacuum of the ion trap 2 was $1\times10^{-2}$ Pa, and the degree of vacuum of the radical generation chamber 51 was 1 Pa. Further, the flow rate of water vapor was 1 sccm. In this mass spectrum, as indicated on the mass spectrum, a mass peak of fragment ions of c series and a series appears, and it can be seen that precursor ions are dissociated at a specific site by radical irradiation. Note that the mass peak intensity of the fragment ion is expanded 50 times. This result experimentally proved that the radio-frequency discharge under vacuum causes a HAD reaction to occur. Further, in the mass spectrum of FIG. 4, a mass peak of a product (adduct) ion ($[M+H+O]^+$) in which oxygen radicals are added to peptide ions (precursor ions) appears, and it can be seen that oxygen radicals are generated by vacuum discharge of water vapor and reacted with the peptide ions.

Figure 5:
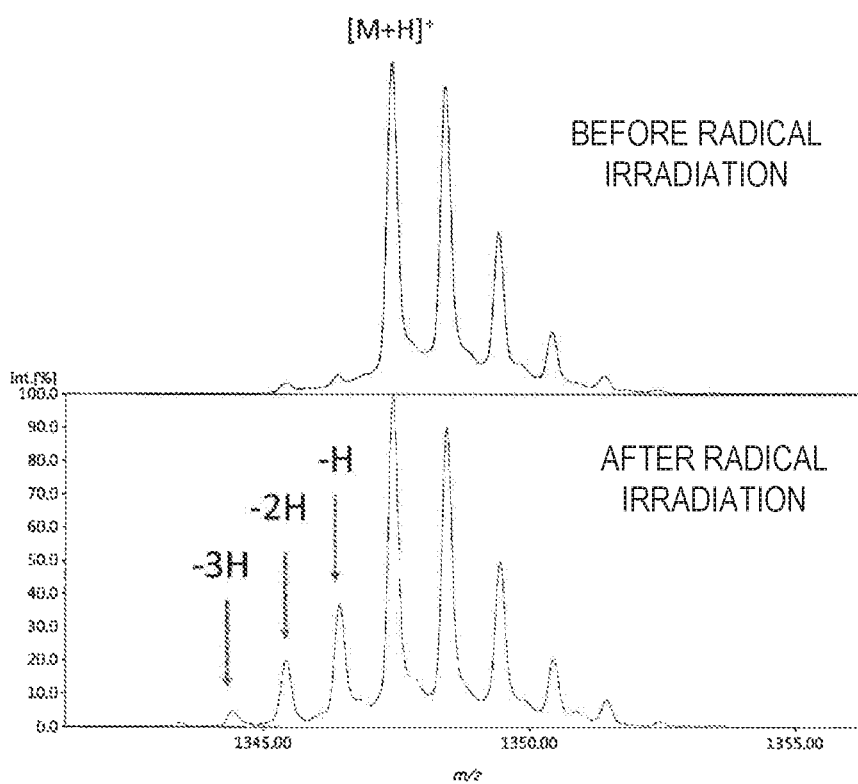
FIG. 5 is a partially enlarged graph of mass spectra obtained by irradiating peptide ions with radicals generated from water vapor by radio-frequency discharge under vacuum and measuring ions in the mass spectrometer of the present embodiment.

FIG. 5 is an enlarged graph of the vicinity of a peak of precursor ions in product ion spectra obtained before and after radical irradiation to the same peptide ions as in FIG. 4. The upper part is a mass spectrum before radical irradiation, and the lower part is a mass spectrum after radical irradiation. Comparing these spectra, in the mass spectrum after radical irradiation, a mass peak of ions in which one or more hydrogens are extracted from the precursor ions appears, and it can be seen that hydroxyl radicals having operation of extracting hydrogen are generated and reacted with the peptide ions.

From the results illustrated in FIGS. 3 to 5, it can be seen that hydrogen radicals, oxygen radicals, and hydroxyl radicals are generated by radio-frequency discharge of water vapor under vacuum. Moreover, in FIGS. 4 and 5, since mass peaks of ions generated by the operation of oxygen radicals and hydroxyl radicals appear clearly, among these three types of radicals, it can be seen that particularly the oxygen radicals and the hydroxyl radicals contribute to dissociation of the peptide ions.

Figure 6:
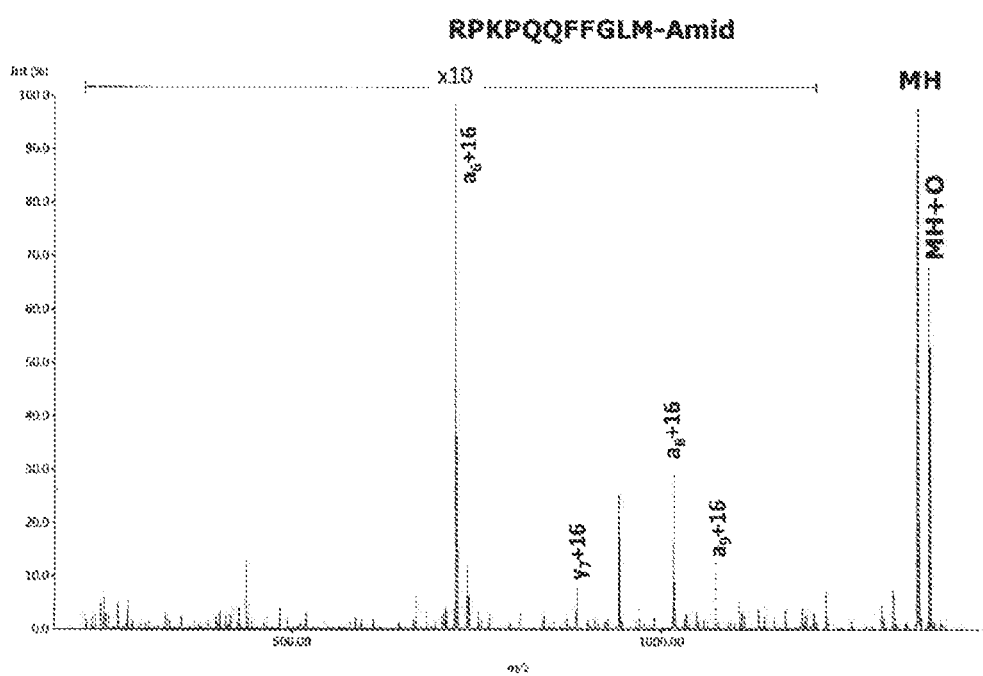
FIG. 6 is a mass spectrum obtained by irradiating peptide ions with radicals generated from air by radio-frequency discharge under vacuum and measuring ions in the mass spectrometer of the present embodiment.

FIG. 6 is a mass spectrum obtained in the mass spectrometer of the above embodiment by capturing peptide ions (arrangement: RPKPQQFFGLM) in the ion trap 2 and irradiating the peptide ions with radicals generated by radio-frequency discharge of air under vacuum (frequency 2.5 GHz, applied power 50 W) for 500 ms. In addition, the mass peak of fragment ions has expanded 10 times. The degree of vacuum of the ion trap 2 was $1\times10^{-2}$ Pa, and the degree of vacuum of the radical generation chamber 51 was 1 Pa. In addition, the flow rate of air was 1 sccm. That is, it is only the type of the material gas that differs from the experiment of FIG. 4.

In the mass spectrum of FIG. 6, mass peaks of product (adduct) ions in which oxygen is attached to a ions and y ions appear characteristically, and it can be seen that oxygen radicals are generated by radio-frequency discharge of air under vacuum and react with peptide ions.

Figure 7:
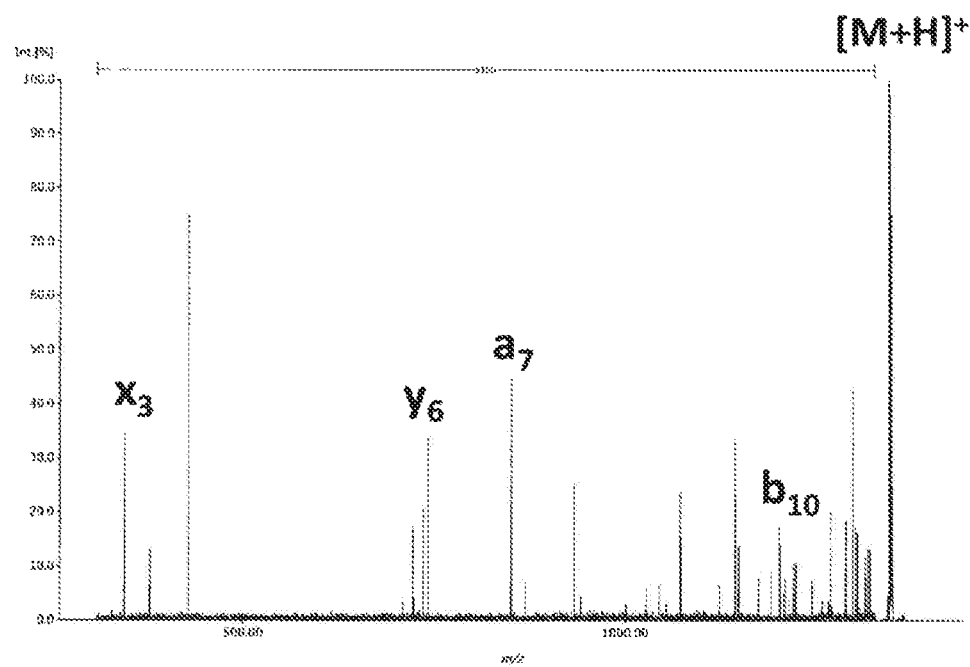
FIG. 7 is a mass spectrum obtained by irradiating peptide ions with radicals generated from nitrogen gas by radio-frequency discharge under vacuum and measuring ions in the mass spectrometer of the present embodiment.

Since a mass peak of ions to which nitrogen adheres could not be confirmed in the mass spectrum of FIG. 6, there was separately performed an experiment of measuring fragment ions by irradiating the precursor ions with radicals generated by radio-frequency discharge of nitrogen gas under vacuum under similar conditions to the above. A product ion spectrum obtained by this experiment is illustrated in FIG. 7. In FIG. 7, mass peak intensity of fragment ions is expanded 100 times. Since mass peaks corresponding to a ion, b ion, x ion, and y ion also appear in the mass spectrum of FIG. 7, it can be seen that nitrogen radicals are generated by radio-frequency discharge of nitrogen gas under vacuum and react with the peptide ions. However, since a mass peak of ions resulting from the nitrogen radicals could not be confirmed in the mass spectrum of FIG. 6, it is conceivable that reactivity of nitrogen radicals is low compared to that of oxygen radicals.

From the above results, it was confirmed that radio-frequency discharge of water vapor, air, and nitrogen gas under vacuum generates oxygen radicals, hydroxyl radicals, hydrogen radicals, and nitrogen radicals, and any of the radicals causes a radical-induced type reaction similarly to the HAD. Further, among these radical species, it was found that reactivity between oxygen radicals and hydroxyl radicals is particularly high.

Figure 8:
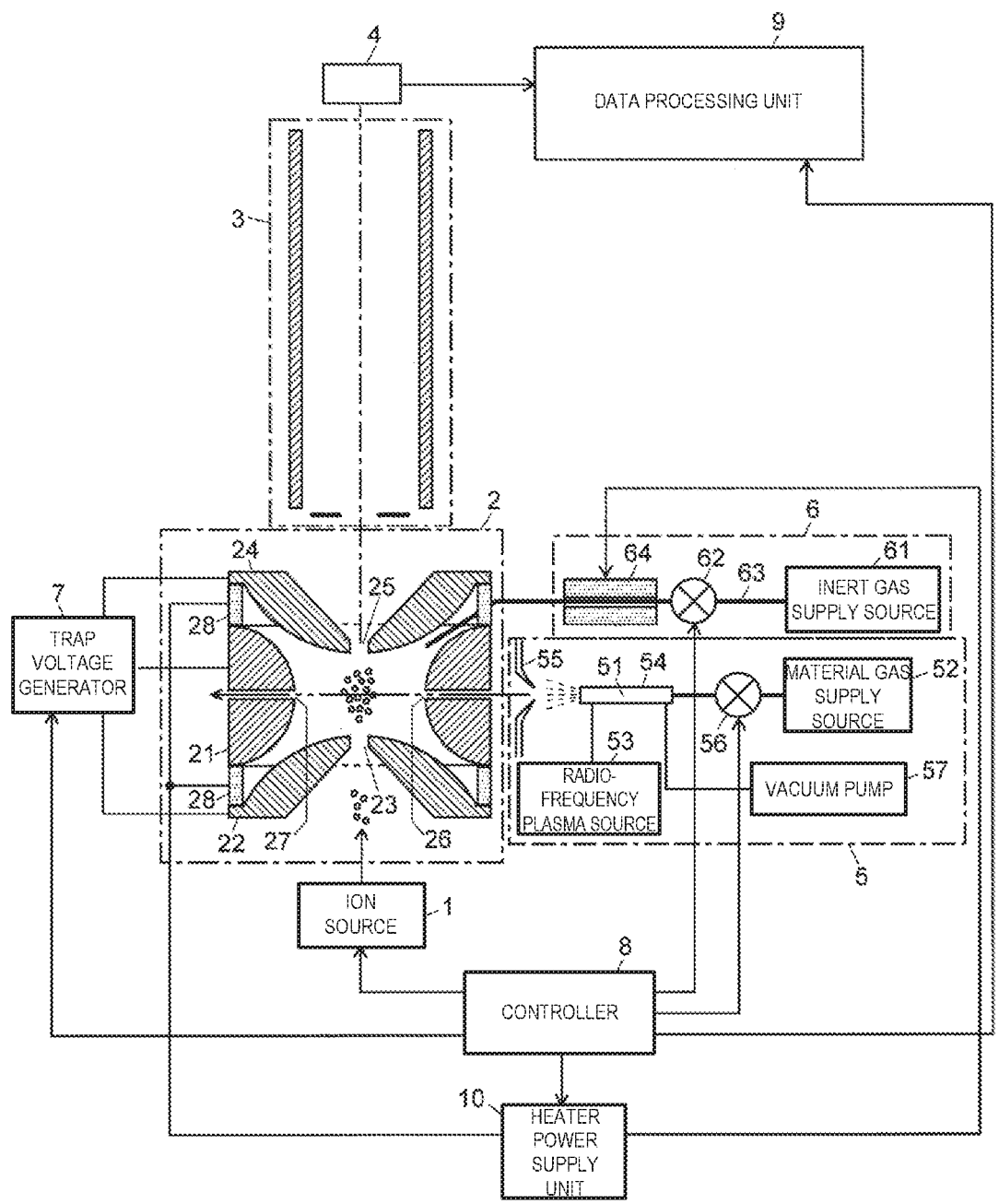
FIG. 8 is a schematic configuration diagram of a mass spectrometer of a modification example.

Next, a modification example having a configuration for further increasing reaction efficiency of precursor ions in the mass spectrometer of the above embodiment will be described with reference to a schematic configuration diagram illustrated in FIG. 8. Note that common components to FIG. 1 will be assigned the same reference numerals and descriptions thereof will be omitted.

In the mass spectrometer of the above embodiment, ions captured in the ion trap 2 are irradiated with radicals generated from the material gas by vacuum discharge to dissociate the ions to generate product ions. Thus, it is possible to generate and analyze product ions derived from a peptide from the sample. However, depending on the type of material gas, reactivity of radicals may be low, and production efficiency of product ions may not necessarily be high. Therefore, the mass spectrometer of the modification example has a configuration for increasing ion dissociation efficiency and increasing sequence coverage of ion dissociation, that is, reducing binding site specificity.

In this mass spectrometer, an insulator (alumina ceramic) member for ensuring electrical insulation between the ring electrode 21 of the ion trap 2 and the endcap electrodes 22, 24 and simultaneously maintaining relative positions of the electrodes 21, 24 is replaced with a ceramic heater 28. The ceramic heater 28 is connected to a heater power supply unit 10. When the heater power supply unit 10 supplies heating power to the ceramic heater 28 under control of the controller 8, the ceramic heater 28 generates heat. Then, the electrodes 21, 22, 24 are also heated by heat conduction from the ceramic heater 28. A thermocouple (not illustrated) is embedded in the ceramic heater 28, heating power supplied based on a monitor temperature of the ceramic heater 28 by the thermocouple is adjusted, and a calorific value of the ceramic heater 28 is feedback controlled. In this manner, the ceramic heater 28 is precisely adjusted to a target temperature.

Helium gas as buffer gas (or other inert gas) is introduced intermittently from the inert gas supplier 6 into the ion trap 2 from a time point when the radicals are introduced into the ion trap 2 as described above to a time point when the product ions are discharged from the ion trap 2 for mass analysis in a state that each of the electrodes 21, 22, 24 of the ion trap 2 is heated by the ceramic heater 28. Heat of each of the electrodes 21, 22, 24 of the ion trap 2 is transmitted to the precursor ions through the buffer gas, and the heat activates the ions, that is, energy by the heat is given to improve dissociation efficiency of the precursor ions. In addition, bonds which are difficult to be cleaved in absence of heat (that is, binding sites with high binding energy) are also susceptible to cleavage, and more types of product ions are generated to improve sequence coverage.

Further, a gas introduction tube heater 64 is also provided around the gas introduction tube 63 supplying gas into the ion trap 2 from the gas supply source 61 of the inert gas supplier 6. Heating power is supplied from the heater power supply unit 10 to the gas introduction tube heater 64 to preheat the gas introduction tube 63, and at a same timing as introducing the buffer gas into the ion trap 2 in the above embodiment, helium gas (or other inert gas), which is buffer gas, is introduced into the ion trap 2 from the inert gas supplier 6. At this time, the helium gas is heated by the gas introduction tube 63 near the gas introduction tube heater 64 and introduced into the ion trap 2 in a high temperature state. When the high-temperature helium gas collides with the precursor ions, the heat of the helium gas is transmitted to the ions to promote ion dissociation due to irradiation of the radicals. Note that it is not always necessary to perform both of heating of the electrodes 21, 22, 24 by the ceramic heater 28 and heating of the buffer gas by the gas introduction tube heater 64, and a configuration to heat only one of the heatings is also possible.

The above-mentioned embodiment and modification example are all examples, and can be suitably changed according to the spirit of the present invention. For example, although the ion trap time-of-flight mass spectrometer equipped with the three-dimensional ion trap is used in the above-described embodiment and modification example, a configuration to use a linear ion trap or a collision cell instead of the three-dimensional ion trap and irradiate radicals at a timing of introduction of precursor ions to the ion trap is also possible. Further, although the time-of-flight mass separator is a linear type in the above-described embodiment and modification example, a time-of-flight mass separator of reflectron type or multi-turn type may also be used. Further, mass separators in forms other than the time-of-flight mass separator may also be used, such as those performing mass separation using the ion separation function of the ion trap 2 itself or an orbitrap, for example. Furthermore, the radical irradiation unit described in the embodiments can be preferably used also in an ion mobility analyzer other than the mass spectrometer. Furthermore, although the radio-frequency plasma source is used as a vacuum discharge unit in the embodiments and modification example, a hollow cathode plasma source can used instead.

In the above experiment, oxygen radicals, hydroxyl radicals, hydrogen radicals, and nitrogen radicals were generated and dissociated by using water vapor, air, and nitrogen gas as material gas, but usable material gas and radical species are not limited thereto. For example, it is also possible to generate radicals from chlorides, sulfur compounds, fluorides, hydroxides, oxides, and carbides represented by hydrochloric acid, sodium chloride, sulfuric acid, sodium sulfide, hydrofluoric acid, sodium fluoride, sodium hydrogen carbonate, sodium hydroxide, hydrogen peroxide, carbon dioxide, carbohydrates, and hydrocarbons, respectively for use in dissociation reaction. In addition, when these gases having reactivity are used, a reactive substance may adhere in the ion trap that produces a dissociation reaction and contaminate the ion trap. If the ion trap is contaminated with such a reactive substance, it is possible that the reactive substance adheres to the precursor ions and causes an undesired mass peak. Therefore, when reactive gas is used as the material gas, it is preferable to employ a configuration having a heating unit (reaction chamber heating unit) that removes (degasses) the gas by heating the ion trap with a heater as in the mass spectrometer of the modification example of FIG. 8. According to a verification conducted by the present inventors, the reactive gas that causes contamination can be removed by heating the ion trap to a temperature of 60° C. or higher. In order to remove the reactive gas more reliably, heating to 80° C. or higher is preferable, and heating to 100° C. or higher is more preferable. Although there is no particular upper limit for the heating temperature, heating the in trap to about 300° C. almost completely removes the reactive gas, and it is conceivable that heating to a temperature higher than that is not necessary. Further, to remove the reactive gas, the ion trap may be heated for at least 5 seconds, and heating for at most 60 minutes is sufficient.

Further, when material gas derived from a compound having a low vapor pressure is used, it is preferable to increase the vapor pressure by employing a configuration including a heating unit on the material gas supply source 52 and/or the flow path from the material gas supply source 52 to the nozzle 54.

Furthermore, although the results of measuring the product ions generated by dissociation of the precursor ions are described in the above experiment, the ion analyzer according to the present invention can also be preferably used when ions generated by addition of atoms or molecules to precursor ions are analyzed.

REFERENCE SIGNS LIST

1 . . . Ion Source
10 . . . Heater Power Supply Unit
2 . . . Ion Trap
21 . . . Ring Electrode
22 . . . Inlet-Side Endcap electrode
23 . . . Ion introduction hole
24 . . . Outlet-Side Endcap electrode
25 . . . Ion ejection hole
26 . . . Radical Introduction Port
27 . . . Radical Releasing Port
28 . . . Ceramic Heater
3 . . . Time-Of-Flight Mass Separator
4 . . . Ion Detector
5 . . . Radical Irradiation Unit
51 . . . Radical Generation Chamber
52 . . . Source Gas Supply Source
53 . . . Radio-Frequency Plasma Source
531 . . . Microwave Supply Source
532 . . . Three Stub Tuner
54 . . . Nozzle
541 . . . Grounding Electrode
542 . . . Torch
543 . . . Needle Electrode
55 . . . Skimmer
56 . . . Valve
57 . . . Vacuum Pump
6 . . . Inert Gas supplier
61 . . . Gas Supply Source
62 . . . Valve
63 . . . Gas Introduction Tube
64 . . . Gas Introduction Tube Heater
7 . . . Trap Voltage Generator 8 . . . Controller
9 . . . Data processing unit

The invention claimed is:

1. An ion analyzer that generates product ions from a precursor ion derived from a sample component and analyzes the product ions, the ion analyzer comprising:
   a reaction chamber into which the precursor ion is introduced;
   a radical generation chamber;
   a material gas supply source configured to introduce material gas into the radical generation chamber;
   a vacuum evacuator configured to evacuate the radical generation chamber;
   a vacuum discharge unit configured to generate vacuum discharge in the radical generation chamber;
   a radical irradiation unit configured to irradiate an inside of the reaction chamber with radicals generated from the material gas in the radical generation chamber; and
   a separation and detection unit configured to separate and detect product ions generated from the precursor ion by reaction with the radicals according to at least one of a mass-to-charge ratio and ion mobility.

2. The ion analyzer according to claim 1, wherein the radicals include at least one of hydroxyl radical, oxygen radical, nitrogen radical, and hydrogen radical.

3. The ion analyzer according to claim 2, wherein the radicals include at least one of hydroxyl radical and oxygen radical.

4. The ion analyzer according to claim 1, wherein the material gas is water vapor or air.

5. The ion analyzer according to claim 1, wherein the vacuum discharge unit is a radio-frequency plasma source or a hollow cathode plasma source.

6. The ion analyzer according to claim 1, wherein the vacuum discharge unit is a capacitively coupled radio-frequency plasma source.

7. The ion analyzer according to claim 1, further comprising
   a heat application unit configured to apply heat to the precursor ions introduced into the reaction chamber.

8. The ion analyzer according to claim 7, wherein the heat application unit includes a reaction chamber heating unit configured to heat the reaction chamber.

9. The ion analyzer according to claim 1, further comprising
   a heating unit provided in at least one of the material gas supply source, the radical generation chamber, and a flow path connecting the material gas supply source and the radical generation chamber, the heating unit being configured to heat a compound of the material gas.

* * * * *